United States Patent
Ng et al.

(10) Patent No.: US 11,695,793 B2
(45) Date of Patent: Jul. 4, 2023

(54) VULNERABILITY SCANNING OF ATTACK SURFACES

(71) Applicant: EntIT Software LLC, Sunnyvale, CA (US)

(72) Inventors: Ming Sum Sam Ng, Sunnyvale, CA (US); Sasi Siddharth Muthurajan, Boston, MA (US); Nidhi Govindram Kejriwal, Sunnyvale, CA (US); Gerald E. Sullivan, II, Roswell, GA (US); Alexander Hoole, Sunnyvale, CA (US)

(73) Assignee: MICRO FOCUS LLC, Sanford, NC (US)

( * ) Notice: Subject to any disclaimer, the term of this patent is extended or adjusted under 35 U.S.C. 154(b) by 477 days.

(21) Appl. No.: 15/799,575

(22) Filed: Oct. 31, 2017

(65) Prior Publication Data

US 2019/0132348 A1 May 2, 2019

(51) Int. Cl.
| | |
|---|---|
| H04L 9/40 | (2022.01) |
| G06F 21/53 | (2013.01) |
| H04L 9/32 | (2006.01) |
| G06F 21/55 | (2013.01) |

(52) U.S. Cl.
CPC .......... *H04L 63/1433* (2013.01); *G06F 21/53* (2013.01); *G06F 21/552* (2013.01); *H04L 9/3239* (2013.01); *H04L 9/3242* (2013.01); *G06F 2221/033* (2013.01); *G06F 2221/2149* (2013.01); *H04L 2209/26* (2013.01)

(58) Field of Classification Search
CPC ... H04L 63/1433; H04L 9/3242; G06F 21/53; G06F 2221/033; G06F 2221/2149

USPC .......................................................... 726/25
See application file for complete search history.

(56) References Cited

U.S. PATENT DOCUMENTS

| | | | |
|---|---|---|---|
| 5,898,836 A | 4/1999 | Freivald et al. | |
| 7,827,166 B2 | 11/2010 | Garg et al. | |
| 8,205,261 B1 | 6/2012 | Andruss et al. | |
| 8,230,510 B1* | 7/2012 | Yang | G06F 21/564 |
| | | | 709/232 |
| 8,763,076 B1 | 6/2014 | Satish et al. | |
| 2010/0287209 A1* | 11/2010 | Hauser | G06F 16/24568 |
| | | | 707/803 |

(Continued)

FOREIGN PATENT DOCUMENTS

| | | | |
|---|---|---|---|
| CN | 105956068 A | 9/2016 | |
| WO | WO-2016164036 A1 * | 10/2016 | ......... H04L 63/1466 |

OTHER PUBLICATIONS

MacDonald et al., "Magic Quadrant for Application Security Testing," Jul. 2, 2013, pp. 1-29, Gartner, Inc., https://securityintelligence.com/wp-content/uploads/2013/07/Gartner-MQ-Application-Security-Testing-Feiman-MacDonald-7-2-13.pdf.

(Continued)

*Primary Examiner* — Sakinah White Taylor (57) ABSTRACT

A method includes: identifying, by a runtime instrumentation agent of a web server, a plurality of attack surfaces of a web application executed on the web server; generating, by the runtime instrumentation agent, a plurality of hash values, where each hash value is generated based on one of the plurality of attack surfaces; and transmitting, by the runtime instrumentation agent, the plurality of hash values to an attack server external to the web server, where the attack server is to determine whether to scan each attack surface based on the plurality of hash values.

20 Claims, 7 Drawing Sheets

(56) References Cited

U.S. PATENT DOCUMENTS

| | | | |
|---|---|---|---|
| 2013/0254829 A1* | 9/2013 | Jakubowski | G06F 21/53 |
| | | | 726/1 |
| 2014/0245460 A1 | 8/2014 | Sum et al. | |
| 2015/0302182 A1* | 10/2015 | Wyatt | G06Q 30/0185 |
| | | | 726/26 |
| 2016/0065613 A1 | 3/2016 | Cho et al. | |
| 2016/0224329 A1* | 8/2016 | Whitney | G06F 8/71 |
| 2016/0267277 A1* | 9/2016 | Muthurajan | G06F 21/577 |
| 2016/0337400 A1* | 11/2016 | Gupta | G06F 16/2455 |
| 2017/0208093 A1* | 7/2017 | Williams | H04L 63/20 |

OTHER PUBLICATIONS

Dimassimo, "How to re-crawl with Nutch," Jun. 11, 2010, pp. 1-3, https://www.pascaldimassimo.com/2010/06/11/how-to-re-crawl-with-nutch/.

Unknown, "Web Application Scanning. Find, fix security holes in web apps, APIs," 2017, pp. 1-17, Qualys Inc., https://www.qualys.com/apps/web-app-scanning/.

Bird, "Chapter 4. Security as Code: Security Tools and Practices in Continuous Delivery," May 2016, pp. 1-38, Safari Books Online, https://www.safaribooksonline.com/library/view/devopssec/9781491971413/ch04.html.

Bird et al., "Attack Surface Analysis Cheat Sheet," Nov. 16, 2017, pp. 1-6, https://www.owasp.org/index.php/Attack_Surface_Analysis_Cheat_Sheet.

Unknown, "WebSite-Watcher," 2018, pp. 1-3, Aignesberger Software GmbH, http://aignes.com/features.htm.

\* cited by examiner

VULNERABILITY SCANNING OF ATTACK SURFACES

BACKGROUND

As computers systems and networks have become widely used, the vulnerability to malicious exploits has increased. Such malicious exploits may include malware, spyware, viruses, and so forth. Some exploits involve loading malicious code on a server accessed via a network. In some examples, the malicious code may modify or otherwise exploit a legitimate web application hosted on the server. Thereafter, any users accessing the web application may be affected by the malicious code on the server.

BRIEF DESCRIPTION OF THE DRAWINGS

Some implementations are described with respect to the following figures.

DETAILED DESCRIPTION

A provider may provide a software application to be accessed by users via a network. For example, a retail company may provide a web application to allow users to purchase products using a web browser. The provider may wish to periodically modify the application to include new functionality, to correct errors, and so forth. Further, the provider may perform automated testing of the software application to determine whether it may be vulnerable to malicious attack. Such automated testing may include identifying attack surfaces of the application, and scanning the identified attack surfaces for potential vulnerabilities. As used herein, an "attack surface" refers to an element or function of an application that is exposed to users and is potentially vulnerable to a malicious attack. For example, an attack surface could be a hyperlink, an argument, an object that retrieves or uses data, and so forth. In some applications, the time consumed during automated testing may exceed a desired level. For example, the testing of an application including a large number of attack surfaces may consume more time than an update cycle for the application. As such, the test results may become obsolete before they are completed.

In accordance with some implementations, examples are provided for automated testing of network applications. As described further below with reference to FIGS. 1-6, some implementations may include a runtime instrumentation agent executed on a web server. The runtime instrumentation agent may identify attack surfaces of a web application executed on the web server, and may generate a hash value for each attack surface. The runtime instrumentation agent may transmit attack surface identifiers and hash values to an attack server. The attack server may compare the identifiers and hash values to historical data indicating attack surfaces that have been previously scanned. The attack server may scan only attack surfaces with hash values that do not match the historical data. In this manner, the attack server may avoid scanning unchanged attack surfaces that have been previously scanned. Accordingly, some examples may reduce the time and processing required for the automated testing.

Figure 1:
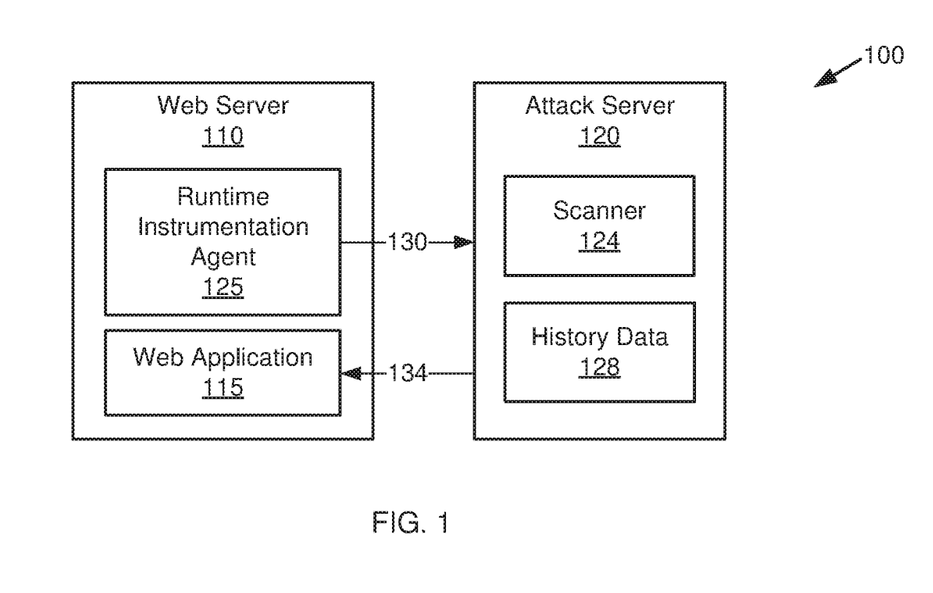
FIG. 1 is a schematic diagram of an example system, in accordance with some implementations.

FIG. 1 shows a schematic diagram of an example system 100, in accordance with some implementations. As shown, in some implementations, the system 100 may include a web server 110 and an attack server 120 connected via a communication network (e.g., a wired and/or wireless network). The web server 110 may include a runtime instrumentation agent 125 and a web application 115. The attack server 120 may include a scanner 124 and history data 128.

In some implementations, the web application 115 may include any number of interface pages and/or functions to be accessed by users using a web browser or other client application (not shown). For example, the web application 115 may include HyperText Mark-up Language (HTML) pages, database functions, e-commerce content, video content, email functions, social network functions, and so forth. In some examples, the web application 115 may execute in a protected portion or space of the web server 110, such that access to the underlying content and/or coding of the web application 115 is limited to authorized users.

In some implementations, the runtime instrumentation agent 125 may instrument the web application 115 during runtime to detect attack surfaces. For example, the runtime instrumentation agent 125 may use instrumentation to detect defined events during execution of the web application 115 (e.g., entry of a function, exit of a function, a fault event, etc.). Such defined events may indicate an attack surface of the web application 115. In another example, the runtime instrumentation agent 125 may identify attack surfaces by matching program elements or parameters to defined types of attack surfaces (e.g., types of HTML pages, scripting elements, server-side elements, methods, universal address locators (URLs), etc.). In some examples, the runtime instrumentation agent 125 may determine or generate an identifier for each detected attack surface.

In some implementations, the runtime instrumentation agent 125 may generate a hash value or checksum for each identified attack surface of the web application 115. In some examples, the hash value may be generated by applying a hash function to a compiled binary and other dependent object binaries corresponding to the identified attack surface. For example, runtime instrumentation agent 125 may generate a hash value using an MD5 function, a SHA function, a timestamp, and so forth. In some implementations, the compiled binary may be compiled from a source file (e.g., a webpage) and any number of linked components (e.g., dependent libraries, functions, etc.).

In some implementations, the runtime instrumentation agent 125 may execute in a protected portion or space of the web server 110 along with the web application 115. As such, the runtime instrumentation agent 125 may have full access to the compiled binaries of the web application 115, including any components or resources that are linked into the source code. Accordingly, the runtime instrumentation agent 125 can analyze all code content executed as part of the web application 115, and may thus detect any changes that may result in an attack surface. Further, because the runtime instrumentation agent 125 provides the attack surface data to the attack server 120, there is no need to provide direct access to the code content of the web application 115 to external devices such as the attack server 120. Accordingly, some examples may provide improved security of the web application 115 from external entities.

In some implementations, the runtime instrumentation agent 125 may transmit attack surface data 130 to the attack server 120. In some examples, the attack surface data 130 may include the hash values and identifiers for the attack surfaces of the web application 115. For example, the identifiers for the attack surfaces may include file names, page identifiers, URLs, function names, and so forth. In some implementations, the scanner 124 of the attack server 120 may compare the attack surface data 130 to the history data 128 to determine a subset of attack surfaces to scan. The scanner 124 may then perform a scan 134 of the determined subset of attack surfaces. Thus, in some examples, the scanner 124 may scan only new attack surfaces, or attack surfaces with hash values that indicate a change in code do not match the historical data. Further, the attack server does not scan unchanged attack surfaces that have been previously scanned. An example operation of the runtime instrumentation agent 125 and the scanner 124 is described below with reference to FIG. 2.

Figure 2:
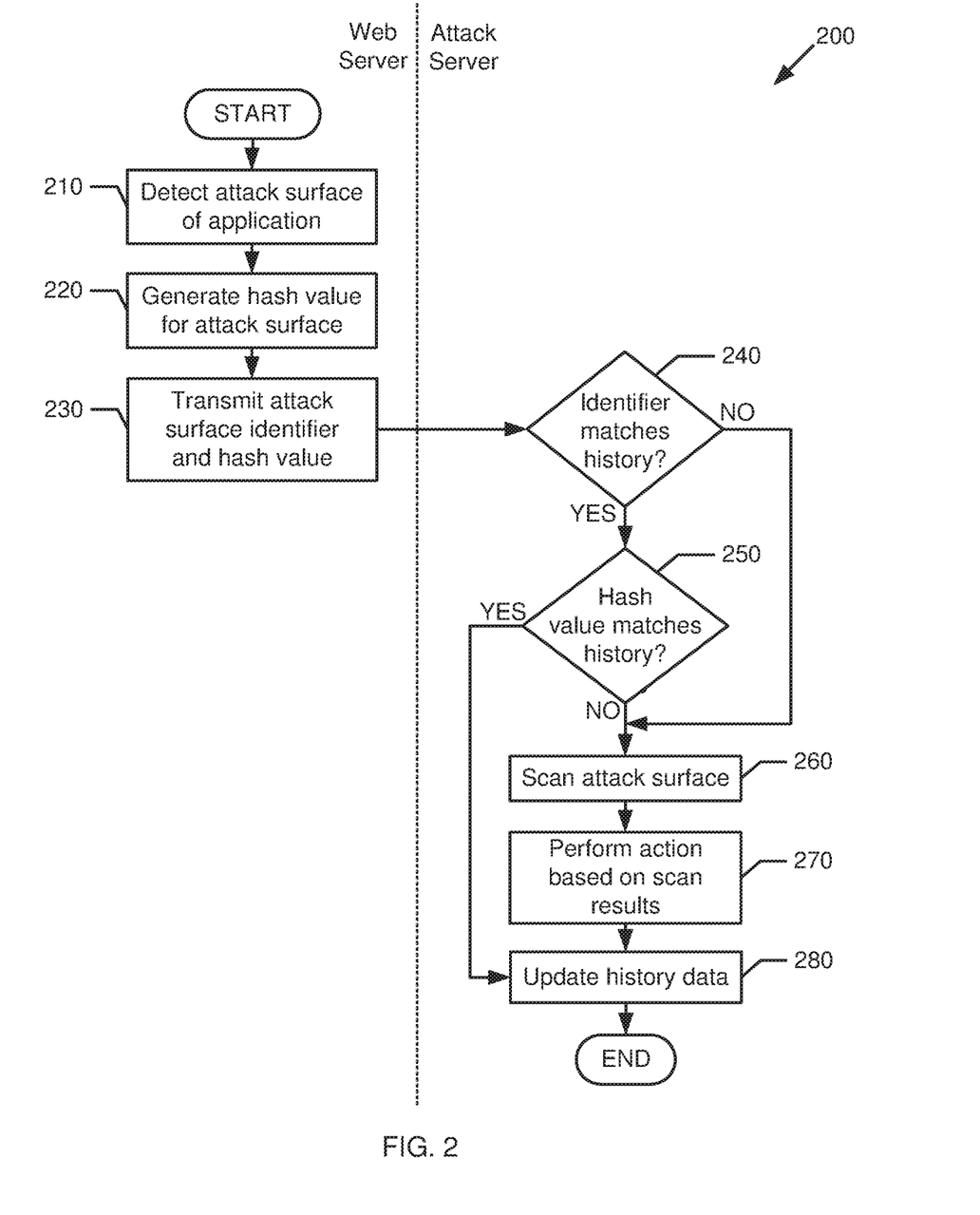
FIG. 2 is an illustration of an example process in accordance with some implementations.

Referring now to FIG. 2, shown is an illustration of an example process 200 in accordance with some implementations. In some examples, the process 200 may be implemented with the system 100 shown in FIG. 1. However, other implementations are also possible. Assume that the process 200 corresponds to a single attack surface. As such, the process 200 may be repeated for each of multiple attack surfaces.

As shown in FIG. 2, block 210 may include detecting an attack surface of an application. For example, referring to FIG. 1, the runtime instrumentation agent 125 may analyze the web application 115 to identify one or more attack surfaces in the web application 115.

Block 220 may include generating a hash value for the detected attack surface. For example, referring to FIG. 1, the runtime instrumentation agent 125 may calculate a hash value by applying a hash function to a source file and a set of linked resources corresponding to an attack surface of the web application 115. In another example, the hash value may be calculated by applying a hash function to a compiled binary and linked dependent object binaries corresponding to the attack surface of the web application 115. In yet another example, the hash value may be calculated as the last modification time of a source file and all linked resources corresponding to the attack surface of the web application 115.

Block 230 may include transmitting an identifier and a hash value for the detected attack surface. For example, referring to FIG. 1, the runtime instrumentation agent 125 may transmit or otherwise communicate the attack surface data 130 to the attack server 120. In some examples, the attack surface data 130 may include identifiers and hash values corresponding to one or more attack surfaces of the web application 115.

Figure 3:
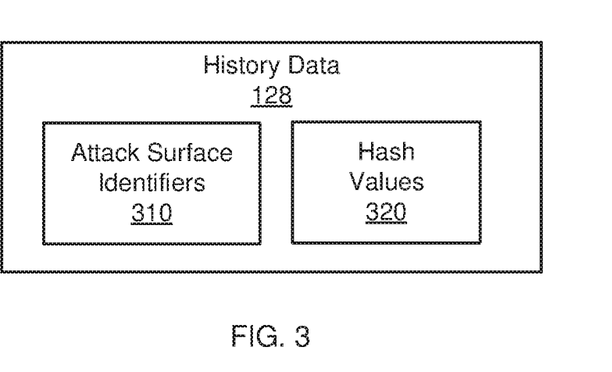
FIG. 3 is an illustration of an example implementation of history data, in accordance with some implementations.

At diamond 240, a determination is made as to whether the received identifier matches a history of identifiers of previously-scanned attack surfaces. For example, referring to FIG. 1, the scanner 124 of the attack server 120 may compare a received identifier in the attack surface data 130 to a list of identifiers of previously-scanned attack surfaces in the history data 128. Referring now to FIG. 3, shown is an illustration of an example implementation of the history data 128. In some implementations, the history data 128 may include identifiers 310 and hash values 320 of attack surfaces that were previously scanned by the scanner 124. In some implementations, the history data 128 may be limited to attack surfaces scanned during a predefined period of time (e.g., in the last day, in the last week, etc.)

If it is determined at diamond 240 that the identifier does not match the history of identifiers of previously-scanned attack surfaces, then the process 200 continues at block 260 (described below). However, if it is determined at diamond 240 that the identifier does match the history of identifiers of previously-scanned attack surfaces, then at diamond 250, a determination is made as to whether the received hash value matches a history of hash values of previously-scanned attack surfaces. For example, referring to FIG. 1, the scanner 124 may compare a received hash value in the attack surface data 130 to a list of hash values of previously-scanned attack surfaces in the history data 128.

If it is determined at diamond 250 that the received hash value matches the history of hash values of previously-scanned attack surfaces, then the process 200 continues at block 280 (discussed below). However, if it is determined at diamond 250 that the received hash value does not match the history of hash values of previously-scanned attack surfaces, then the process 200 continues at block 260.

Block 260 may include scanning the attack surface. Block 270 may include performing an action based on the scan results. For example, referring to FIG. 1, the scanner 124 may scan the attack surface in response to determining that the identifier does not match the history data 128, or that the hash value does not match the history data 128. In some implementations, the scanning of an attack surface may include performing any number of tests to detect known vulnerabilities of an application. If it is determined that the attack surface is vulnerable, the scanner may perform a predefined action (e.g., raise an alert, stop the application, update a log, execute a mitigation action, and so forth).

Block 280 may include updating the history data. For example, referring to FIG. 1, the scanner 124 may add the received identifier and hash value of the scanned attack surface to the history data 128. After block 280, the process 200 is completed.

In some implementations, the process 200 may be repeated for processing multiple attack surfaces. In some examples, the scanning of attack surfaces (e.g., block 260) may be deferred until the detected attack surfaces exceed a defined threshold level. For example, referring to FIG. 1, the scanner 124 may increment a counter for each identified attack surface, and may begin scanning the identified attack surfaces in response to a determination that the counter has exceed a count threshold. In other examples, the scanner 124 may not begin scanning until the identified attack surfaces exceed a minimum percentage or proportion. In still other examples, the scanning of attack surfaces may be delayed until a given time period for detection of attack surfaces has elapsed.

Figure 4:
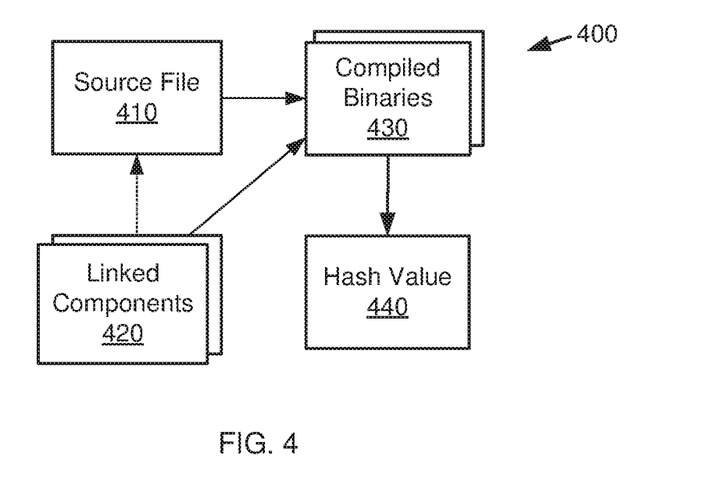
FIG. 4 is a diagram of an example operation, in accordance with some implementations.

As discussed above with reference to block 220, in some examples the hash value may be calculated using a compiled binary and linked dependent object binaries. Referring now to FIG. 4, shown is an illustration of an example operation 400 to generate a hash value using compiled binaries, in accordance with some implementations. In some examples, the operation 400 may be implemented with the system 100 shown in FIG. 1. However, other implementations are also possible.

As shown in FIG. 4, the operation 400 may include compiling a source file 410 and a set of linked components 420 to generate compiled binaries 430. For example, the source file 410 may be webpage, and the linked components 420 may include dependent libraries or classes that are referenced in the source file 410. In some examples, the compiled binaries 430 may be generated by a compiler, and may be executed by an application execution engine (not shown).

Figure 5:
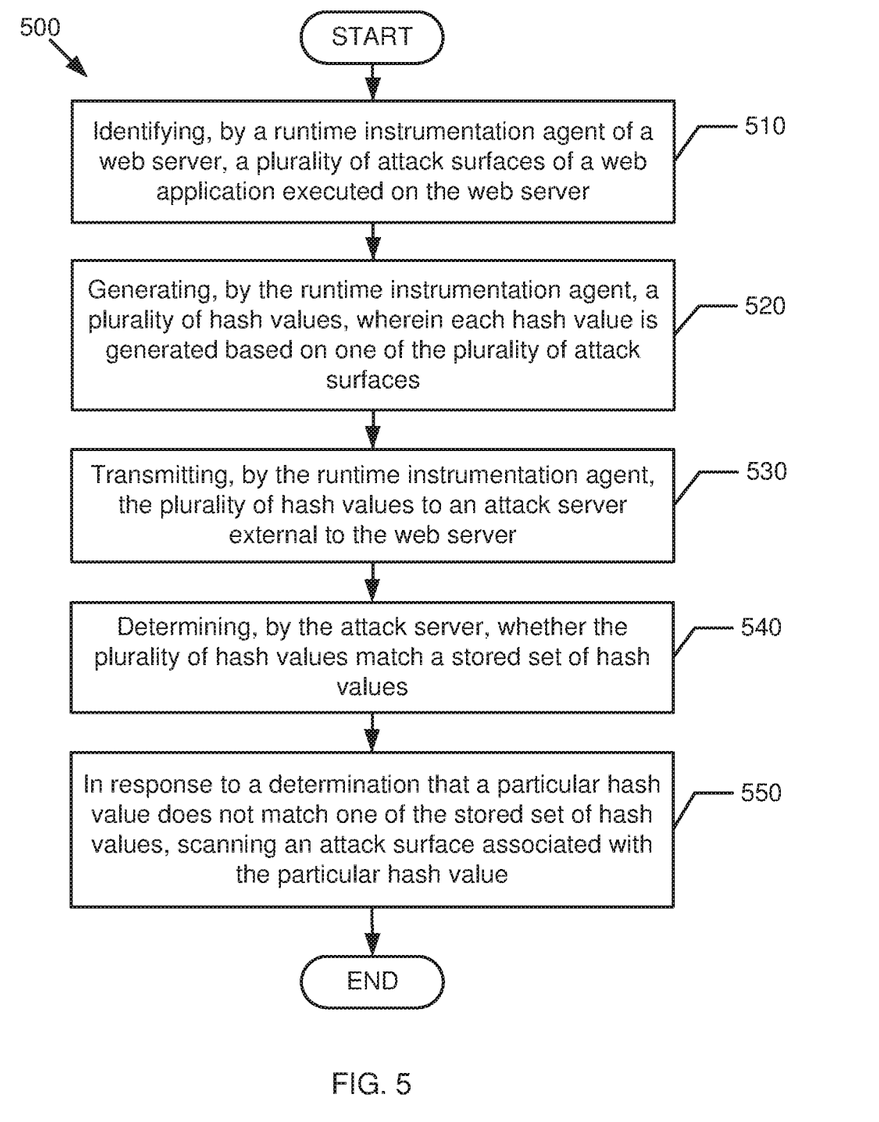
FIG. 5 is a flow diagram of an example process, in accordance with some implementations.

Referring now to FIG. 5, shown is an example process 500, in accordance with some implementations. In some examples, the process 500 may be performed by some or all of the system 100 shown in FIG. 1. The process 500 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 300 may be described below with reference to FIGS. 1-4, which show examples in accordance with some implementations. However, other implementations are also possible.

Block 510 may include identifying, by a runtime instrumentation agent of a web server, a plurality of attack surfaces of a web application executed on the web server. For example, referring to FIG. 1, the runtime instrumentation agent 125 may instrument the web application 115 to detect attack surfaces.

Block 520 may include generating, by the runtime instrumentation agent, a plurality of hash values, where each hash value is generated based on one of the plurality of attack surfaces. For example, referring to FIG. 1, the runtime instrumentation agent 125 may analyze a compiled binary or a source file for the associated attack surface to discover all the dependent libraries and classes, and then apply a hash function to all related objects to calculate a hash or checksum value for the received attack surface. In some implementations, the hash value may be the last modification time of the attack surface and all the dependent binary objects.

Block 530 may include transmitting, by the runtime instrumentation agent, the plurality of hash values to an attack server external to the web server. For example, referring to FIG. 1, the runtime instrumentation agent 125 may communicate the attack surface data 130 to the attack server 120.

Block 540 may include determining, by the attack server, whether the plurality of hash values match a stored set of hash values. For example, referring to FIG. 1, the scanner 124 of the attack server 120 may compare a received hash value to previously-scanned hash values in the history data 128.

Block 550 may include, in response to a determination that a particular hash value does not match one of the stored set of hash values, scanning an attack surface associated with the particular hash value. For example, referring to FIG. 1, the scanner 124 may scan an attack surface in response to determining that the associated hash value is not included in the history data 128. After block 550, the process 500 is completed.

Figure 6:
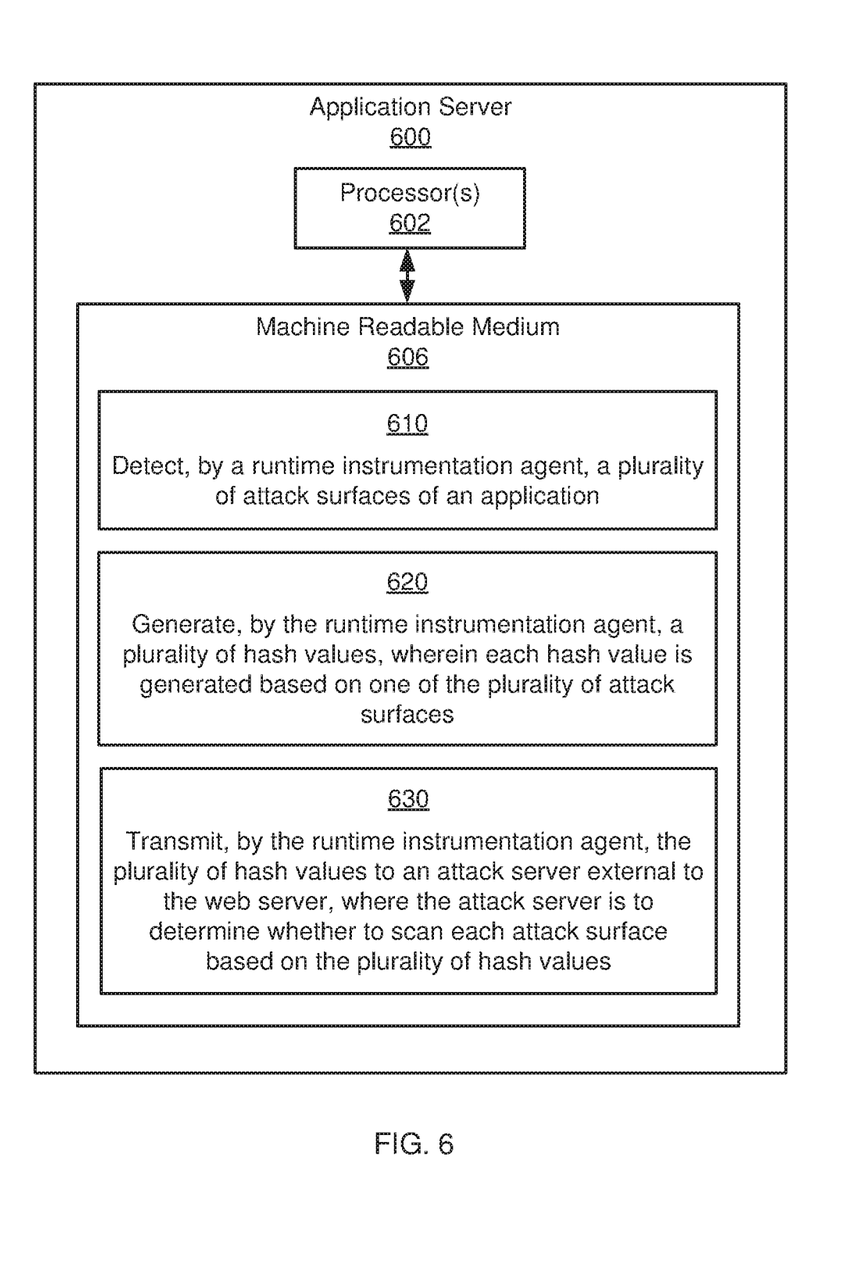
FIG. 6 is a schematic diagram of an example application server, in accordance with some implementations.

Referring now to FIG. 6, shown is a schematic diagram of an example application server 600. In some examples, the application server 600 may correspond generally to the web server 110 shown in FIG. 1. As shown, the application server 600 may include a hardware processor(s) 602 and machine-readable storage medium 606. The machine-readable storage medium 606 may be a non-transitory medium, and may store instructions 610-630. The instructions 610-630 can be executed by the hardware processor(s) 602.

Instruction 610 may detect, by a runtime instrumentation agent of the application server 600, a plurality of attack surfaces of an application. Instruction 620 may generate, by the runtime instrumentation agent, a plurality of hash values, where each hash value is generated based on one of the plurality of attack surfaces. Instruction 630 may transmit, by the runtime instrumentation agent, the plurality of hash values to an attack server external to the web server, where the attack server is to determine whether to scan each attack surface based on the plurality of hash values.

Figure 7:
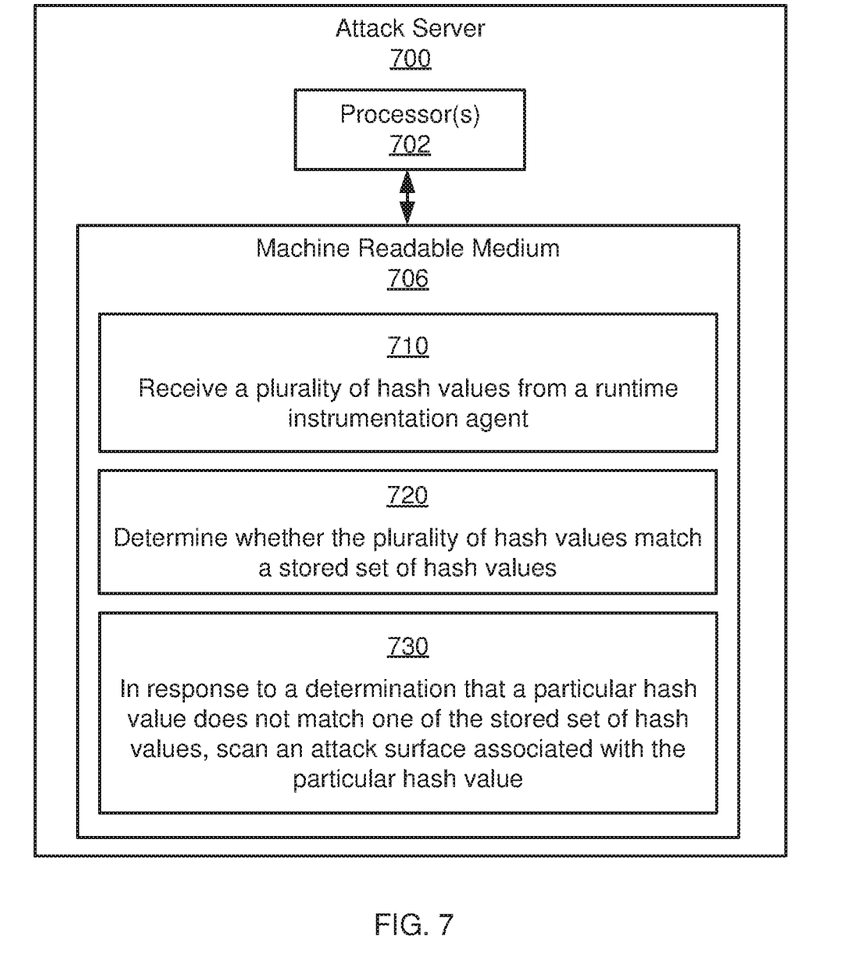
FIG. 7 is a schematic diagram of an example attack server, in accordance with some implementations.

Referring now to FIG. 7, shown is a schematic diagram of an example attack server 700. In some examples, the attack server 700 may correspond generally to the attack server 120 shown in FIG. 1. As shown, the application server 700 may include a hardware processor(s) 702 and machine-readable storage medium 706. The machine-readable storage medium 706 may be a non-transitory medium, and may store instructions 710-730. The instructions 710-730 can be executed by the hardware processor(s) 702.

Instruction 710 may receive a plurality of hash values from a runtime instrumentation agent. Instruction 720 may determine whether the plurality of hash values match a stored set of hash values. Instruction 730 may, in response to a determination that a particular hash value does not match one of the stored set of hash values, scan an attack surface associated with the particular hash value.

Figure 8:
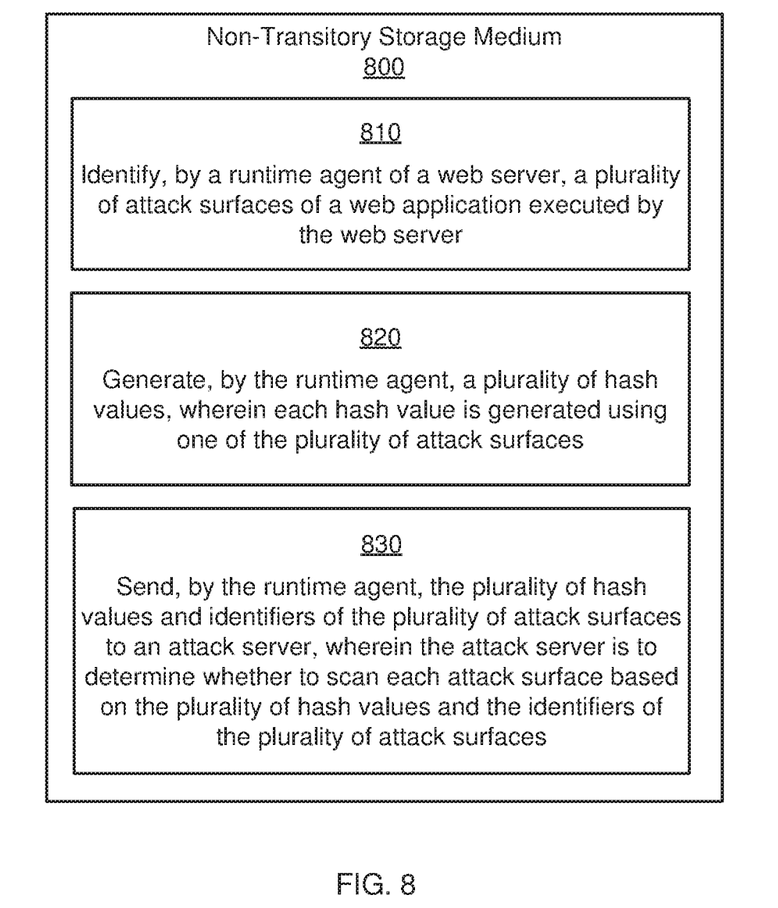
FIG. 8 is a diagram of an example non-transitory storage medium storing instructions in accordance with some implementations.

Referring now to FIG. 8, shown is a non-transitory storage medium 800 storing instructions 810-830, in accordance with some implementations. The instructions 810-830 can be executed by any number of processors (e.g., the processor 602 shown in FIG. 6). The non-transitory storage medium 800 may be a machine-readable storage medium, such as an optical, semiconductor, or magnetic storage medium.

Instruction 810 may identify, by a runtime agent of a web server, a plurality of attack surfaces of a web application executed by the web server. Instruction 820 may generate, by the runtime agent, a plurality of hash values, where each hash value is generated using one of the plurality of attack surfaces. Instruction 830 may send, by the runtime agent, the plurality of hash values and identifiers of the plurality of attack surfaces to an attack server, where the attack server is to determine whether to scan each attack surface based on the plurality of hash values and the identifiers of the plurality of attack surfaces.

In accordance with some implementations, examples are provided for automated testing of network applications. Some implementations include using runtime instrumentation agent to detect attack surfaces of a web application executed on the web server, and to generate a hash value for each attack surface. The hash values and identifiers may be used by an attack server to determine which attack surfaces are new or have been changed. As such, the attack server may avoid scanning unchanged attack surfaces that have been previously scanned. In this manner, some examples may reduce the amount of processing and time required for automated testing of the web application.

Note that, while FIGS. 1-8 show various examples, other implementations are contemplated. For example, referring to FIGS. 1-2, it is contemplated that the runtime instrumentation agent 125 may only transmit identifiers for attack surfaces, and the scanning (at block 260) may be performed for identifiers that do not match the history data 128 (i.e., without checking attack surface hash values). In another example, it is contemplated that the runtime instrumentation agent 125 may only transmit hash values for attack surfaces, and the scanning may be performed for hash values that do not match the history data 128 (i.e., without checking attack surface identifiers). In another example, referring to FIG. 1, it is contemplated that the system 100 may include any number of devices or systems, and each device may include additional components than those shown in FIG. 1. In yet another example, it is contemplated that the history data 128 shown in FIG. 3 may include additional fields, may have fewer fields, may use any data format, and so forth. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method, comprising:
  identifying, by a runtime instrumentation agent of a web server, a plurality of attack surfaces of a web application executed on the web server, wherein each attack surface of the plurality of attack surfaces is an exposed portion of the web application that is identified by the runtime instrumentation agent as being potentially vulnerable to an external attack;
  generating, by the runtime instrumentation agent, a plurality of hash values of the plurality of attack surfaces of the web application, by applying a hash function to compiled binaries of the plurality of attack surfaces; and
  transmitting, by the runtime instrumentation agent, the plurality of hash values of the plurality of attack surfaces and identifiers of the plurality of attack surfaces of the web application to an attack server external to the web server,
  wherein the attack server is to:
    compare the plurality of hash values of the plurality of attack surfaces to historical data of attack surfaces to identify a subset of hash values that do not match the historical data of attack surfaces,
    determine a subset of attack surfaces of the web application corresponding to the subset of hash values that do not match the historical data of attack surfaces,
    scan only the subset of attack surfaces of the web application executed on the web server, and
    in response to identifying a vulnerable attack surface based on the scanning of the subset of attack surfaces, perform a predefined mitigation action on the vulnerable attack surface.

2. The method of claim 1, further comprising:
  determining, by the attack server, whether the plurality of hash values of the plurality of attack surfaces match a stored set of hash values; and
  in response to a determination that a particular hash value of the plurality of hash values does not match any of the stored set of hash values, scanning an attack surface of the web application associated with the particular hash value.

3. The method of claim 2, further comprising:
  updating, by the attack server, the stored set of hash values to include the plurality of hash values.

4. The method of claim 2, further comprising:
  determining, by the attack server, whether any of the identifiers of the plurality of attack surfaces match a stored set of identifiers; and
  in response to a determination that a first identifier of the identifiers of the plurality of attack surfaces does not match any of the stored set of identifiers, scanning a first attack surface of the web application associated with the first identifier.

5. The method of claim 4, further comprising, in response to a determination that the first identifier matches one of the stored set of identifiers:
  determining whether a hash value for the first attack surface matches any of the stored set of hash values; and
  in response to a determination that the hash value for the first attack surface does not match any of the stored set of hash values, scanning the first attack surface.

6. The method of claim 4, further comprising:
  in response to the determination that the first identifier does not match any of the stored set of identifiers, updating the stored set of identifiers to include the first identifier.

7. The method of claim 1, wherein generating each hash value of the plurality of hash values comprises:
  analyzing a source file of one of the plurality of attack surfaces associated with the hash value to identify a plurality of linked components; and
  performing a hash function of the source file and the plurality of linked components to generate the hash value.

8. The method of claim 1, further comprising:
  incrementing, by the attack server, a counter for each of the subset of hash values that do not match the historical data of attach surfaces; and
  in response to a determination that the counter exceeds a count threshold, attacking the subset of attack surfaces of the web application associated with the subset of hash values.

9. An article comprising a non-transitory storage medium storing instructions that upon execution cause a processor to:
  identify a plurality of attack surfaces of a web application executed by a web server, wherein the plurality of attack surfaces are exposed portions of the web application that are identified as being potentially vulnerable to an external attack;

generate a plurality of hash values of the plurality of attack surfaces of the web application, by applying a hash function to compiled binaries of the plurality of attack surfaces; and send the plurality of hash values of the plurality of attack surfaces and identifiers of the plurality of attack surfaces to an attack server, wherein the attack server is to:

compare the plurality of hash values of the plurality of attack surfaces to historical data of attack surfaces to identify a subset of hash values that do not match the historical data of attack surfaces, determine a subset of attack surfaces of the web application corresponding to the subset of hash values that do not match the historical data of attack surfaces, scan only the subset of attack surfaces of the web application executed on the web server, and in response to identifying a vulnerable attack surface based on the scanning of the subset of attack surfaces, perform a predefined mitigation action on the vulnerable attack surface.

10. The article of claim 9, wherein the instructions further cause the processor to:

increment a counter for each of the subset of hash values that do not match the historical data of attack surfaces; and in response to a determination that the counter exceeds a count threshold, attack the subset of attack surfaces of the web application associated with the subset of hash values.

11. The article of claim 9, wherein the instructions further cause the processor to detect defined events during the execution of the web application.

12. The article of claim 9, wherein the instructions further cause the processor to:

for each hash value of the plurality of hash values, generate the hash value by applying the hash function to a source file and a plurality of linked components, wherein the source file and the plurality of linked components corresponds to one of the plurality of attack surfaces.

13. The article of claim 12, wherein the source file is a compiled binary of the compiled binaries.

14. The article of claim 9, wherein the web application is executed in a protected portion of the web server.

15. A system comprising:

an application server including a first processor and a first storage medium storing first instructions, the first instructions executable by the first processor to:

detect a plurality of attack surfaces of an application of the application server, wherein each attack surface of the plurality of attack surfaces is an exposed portion of the application that is identified as being potentially vulnerable to an external attack;

generate a plurality of hash values of the plurality of attack surfaces of the application, by applying a hash function to compiled binaries of the plurality of attack surfaces; and transmit the plurality of hash values of the plurality of attack surfaces and identifiers of the plurality of attack surfaces of the application to an attack server external to the application server, wherein the attack server is to:

compare the plurality of hash values of the plurality of attack surfaces to historical data of attack surfaces to identify a subset of hash values that do not match the historical data of attack surfaces, determine a subset of attack surfaces of the application corresponding to the subset of hash values that do not match the historical data of attack surfaces, scan only the subset of attack surfaces of the application executed on the application server, and in response to identifying a vulnerable attack surface based on the scanning of the subset of attack surfaces, perform a predefined mitigation action on the vulnerable attack surface.

16. The system of claim 15, further comprising:

the attack server including a second processor and a second storage medium storing second instructions, the second instructions executable by the second processor to:

receive the plurality of hash values and the identifiers of the plurality of attack surfaces from application server;

determine whether the plurality of hash values match a stored set of hash values; and in response to a determination that a particular hash value of the plurality of hash values does not match any of the stored set of hash values, scan a first attack surface of the application associated with the particular hash value.

17. The system of claim 16, wherein the second instructions are executable by the second processor to:

update the stored set of hash values to include the plurality of hash values.

18. The system of claim 15, wherein the first instructions are executable by the first processor to:

for each hash value of the plurality of hash values:

analyze a source file to identify a plurality of linked components; and compute a hash function of the source file and the plurality of linked components to generate the hash value.

19. The system of claim 15, wherein the first instructions are executable by the first processor to:

provide instrumentation of the application, wherein the instrumentation is to detect defined events during execution of the application.

20. The system of claim 15, wherein the application is executed in a protected portion of the application server.

* * * * *